No. 831,128. PATENTED SEPT. 18, 1906.
J. WILLSON & A. TRAEGER.
TIRE REMOVER.
APPLICATION FILED JAN. 10, 1905.
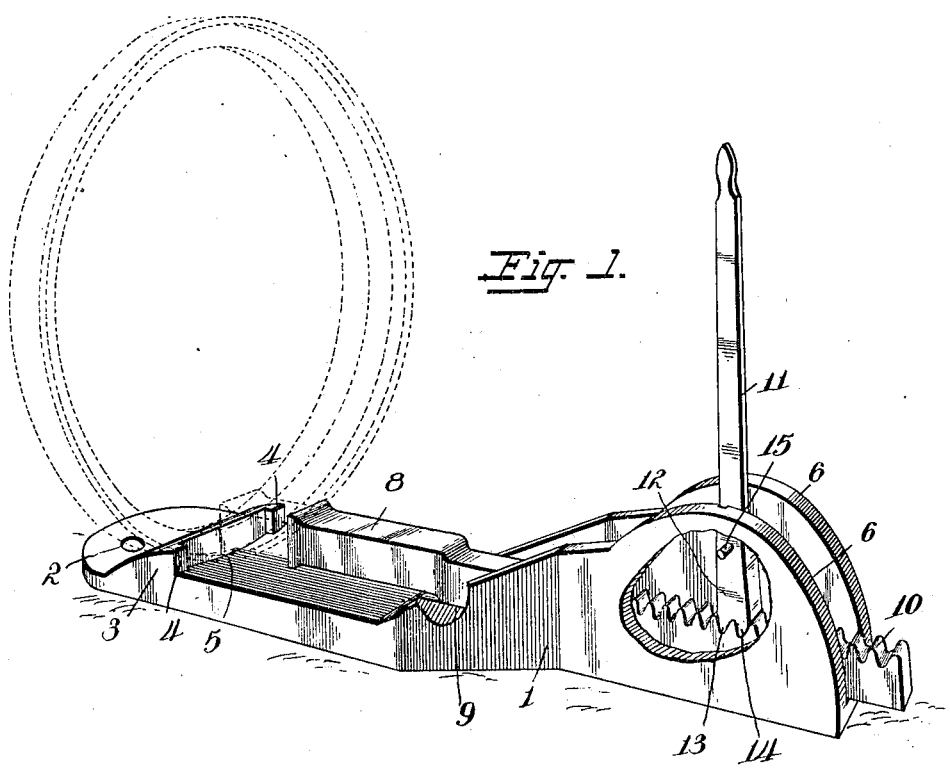
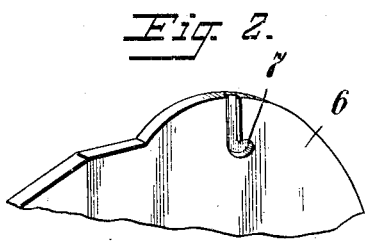
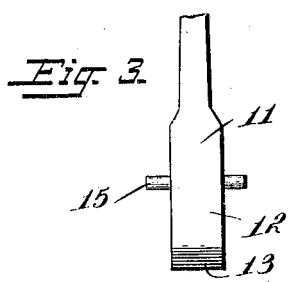
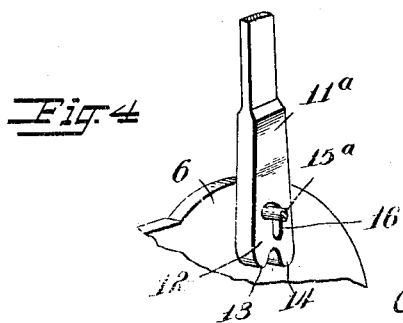
Witnesses
Inventors:
Augustus Traeger
James Willson
by Henry N. Copp
their Attorney

UNITED STATES PATENT OFFICE.

JAMES WILLSON AND AUGUSTUS TRAEGER, OF PORTERVILLE, CALIFORNIA.

TIRE-REMOVER.

No. 831,128.  Specification of Letters Patent.  Patented Sept. 18, 1906.

Application filed January 10, 1905. Serial No. 240,522.

*To all whom it may concern:*

Be it known that we, JAMES WILLSON and AUGUSTUS TRAEGER, citizens of the United States, residing at Porterville, in the county of Tulare and State of California, have invented a new and useful Tire-Remover, of which the following is a specification.

Our invention relates to tire-removers of the type employing a plunger having a rack and an operating-lever having teeth adapted to engage the rack to work the plunger.

The object of the present invention is more particularly to provide in a tire-remover of the type set forth a base having an abutment and an improved shiftable pivotal connection between the base and the operating-lever, whereby the operating-lever can be shifted out of engagement with the rack of the plunger and the plunger quickly positioned against the felly of the wheel from which the tire is to be removed and the operating-handle thereupon reëngaged with the rack and used to apply the pressure to force the felly from the tire.

Another object of our invention is the provision of a device of the class described which may be used on wheels of any size or irregularity of formation and employed to remove the tire without injury to the felly, while a further object is generally the provision of a tire-remover of simple, strong, and durable construction and few parts and one which will not be likely to get out of order.

The detailed construction of the invention and its manner of operation are set forth fully hereinafter, while the novel features are recited in the appended claims.

In the accompanying drawings, Figure 1 is a perspective view of the complete invention, showing the manner of use thereof, certain parts being broken away; Fig. 2, a detail of one of the uprights of the base, showing the improved form of trunnion bearing or slot which we employ; Fig. 3, a detail of the operating-lever where a fixed trunnion is secured; and Fig. 4, a detail of a modification showing how the improved slot may be formed in the operating-lever when the trunnion is secured to the base-frame.

The base-frame 1 is of a single piece of cast metal, having an aperture 2 for securing it to the floor by a suitable lag-screw or other fastening. Rising from the base is an anvil 3 of a height equal the thickness of the heaviest tire in use and which is provided with the offsets or projections 4. If the tire is of less width than the height of the anvil 3, a strip of metal will be placed on the base at 5 under the tire, so as to elevate it to the required height. Formed integral with the base and rising therefrom are the side pieces or standards 6, having the substantially L-shaped slots 7, whose substantially horizontal portions point in the opposite direction from the anvil 3 and whose vertical portions lead out through the top edges of the standards 6. It will be understood that while these slots are of general L shape it is not necessary that they exactly conform to that description, because they might be made substantially on a curve or of other form provided they are of such formation that they comprise two parts at more or less of an angle to each other. Slidable back and forth between the standards or uprights 6 is the plunger 8, which is supported by the raised portion 9 of the base at the proper height to just clear the projections 4 4 and the top of the anvil 3, and this plunger is provided with a rack 10 on its upper edge. The operating-lever is shown at 11, said lever having a bifurcated lower end 12, thus forming two teeth 13 and 14, adapted to suitably mesh with the teeth of rack 10. Secured firmly to the lever 11 is the pivot or trunnion 15, whose portions project on opposite sides of said lever and are received in the slots 7. The trunnions are entered in the upright portions of the slot 7, which permit the lever to be raised or lowered vertically, as desired, while when said trunnions pass into the substantially horizontal portions of said slots 7 there is then provided an abutment against which said trunnions fulcrum to enable the plunger to be worked by operating the lever, as the teeth 13 and 14 are then in engagement with the rack 10.

In the modification shown in Fig. 4 a single opening 16 of inverted L shape passes through the operating-lever 11ª and the trunnion 15ª is rigidly secured to the standards 6 and extends from one to the other, said trunnion passing through the opening 16. The principle of operation is the same, as the construction enables the operating-lever to be raised or lowered and fulcrumed and made to operate the plunger.

In using the tire-remover the wheel from which the tire is to be displaced is rested on the part 5 of the base and against the projections 4, the plunger 8 having been retreated a suitable distance to admit the wheel. The operating-lever 11 is then lifted vertically until its teeth 13 and 14 are clear of the rack 10, and the plunger is quickly moved forward until it rests against the felly of the wheel, and the lever is thereupon dropped and operated to forcibly remove the tire. On account of the peculiar shape of the slots 7 or slot 16 the trunnions or trunnion prevent the lever rising vertically, so that it cannot become disengaged from the rack 10. After the plunger has been advanced as far as one operation of the lever will permit it to move the lever is then returned to an upright position and the wheel turned to bring another point of the felly in front of the plunger, after which the operation is repeated, and thus by successive operations the wheel is entirely gone around. The lever can then be lifted to advance the plunger a little farther and the successive operations of applying pressure to different points of the felly repeated until the tire is completely removed.

The main advantage obtained by our invention over tire-removers heretofore known to the art is the use of the improved loose-fulcrum connection for the lever, which permits a rapid initial adjustment of the plunger to suit the width of the felly, after which the lever is engaged with the rack and stands in an upright position, so that the operator can exert the greatest pressure with the least difficulty, and this remains true on successive operations on a given wheel after the felly has been forced all around to a certain extent, whereas with other devices known to the art the lever gradually departs from its upright or most convenient position and makes the operation of the device more awkward and less powerful with a given act on the part of the operator as the operation proceeds, or with prior devices it is necessary to entirely shift the operating-lever and obtain a new fulcrum.

Having thus described our invention, what we claim as new, and desire to secure by Letters Patent, is—

1. In a tire-remover, the combination with a base having an abutment for the wheel, of a plunger slidably mounted on the base for removing the tire, and a lever engaged with but not connected to the plunger for operating the plunger, said lever being disengageable from the plunger and having a shiftable pivotal connection with the base permitting said lever to be shifted into and out of operative engagement with the plunger.

2. In a tire-remover, the combination with a base having an abutment for the wheel, of a plunger slidably mounted on the base for removing the tire, and a lever engaged with but not connected to the plunger and having a shiftable pivotal connection with the base comprising a slot having two parts arranged out of a straight line in relation to each other, and a pivot movable in said slot, whereby the lever can be shifted out of operative engagement with the plunger and is also prevented from disengagement from the plunger during the operation of the device.

3. In a tire-remover, the combination with a base having an abutment for the wheel, of a plunger slidably mounted on the base for removing the tire, said plunger having a rack, and a lever engaged with but not connected to the plunger and having a tooth to detachably engage the rack and also having a loose pivotal connection with the base comprising a slot having two parts which are out of a straight line in relation to each other, one part of the slot being substantially parallel to the plunger and the other part being substantially at right angles to the plunger, and a pivot received in the slot, whereby the operating-lever can be shifted out of engagement with the rack but is held in engagement therewith during the operation of the device.

In witness whereof we have hereunto set our hands and seals, in the presence of two subscribing witnesses, at Porterville, in the county of Tulare, State of California, this 5th day of December, A. D. 1904.

JAMES WILLSON. [L. S.]
AUGUSTUS TRAEGER. [L. S.]

Witnesses:
F. S. PRICE,
F. W. VELIE.